(12) United States Patent
Bhatnagar et al.

(10) Patent No.: US 11,789,802 B2
(45) Date of Patent: Oct. 17, 2023

(54) SYSTEM AND METHOD OF MAPPING AND DIAGNOSTICS OF DATA CENTER RESOURCES

(71) Applicant: JIO PLATFORMS LIMITED, Ahmedabad (IN)

(72) Inventors: Aayush Bhatnagar, Navi Mumbai (IN); Munir Sayyad, Raighad (IN); Anup Patil, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 168 days.

(21) Appl. No.: 16/945,596

(22) Filed: Jul. 31, 2020

(65) Prior Publication Data
US 2021/0073065 A1    Mar. 11, 2021

(30) Foreign Application Priority Data
Jul. 31, 2019 (IN) .............................. 201921030943

(51) Int. Cl.
G06F 11/07 (2006.01)
H04L 41/0631 (2022.01)
H04L 41/12 (2022.01)

(52) U.S. Cl.
CPC ........ *G06F 11/079* (2013.01); *G06F 11/0709* (2013.01); *H04L 41/064* (2013.01); *H04L 41/12* (2013.01)

(58) Field of Classification Search
CPC .... G06F 11/079; G06F 11/0709; H04L 41/12; H04L 41/064
See application file for complete search history.

(56) References Cited

U.S. PATENT DOCUMENTS

| | | | | |
|---|---|---|---|---|
| 7,051,098 B2 * | 5/2006 | Masters | ............... | G06F 9/5038 709/224 |
| 2010/0058108 A1 * | 3/2010 | Nammatsu | .......... | G06F 11/0775 714/39 |
| 2011/0314138 A1 * | 12/2011 | Kobayashi | .......... | G06F 11/3476 709/222 |
| 2013/0185667 A1 * | 7/2013 | Harper | ............... | G06F 11/0709 715/772 |
| 2016/0191369 A1 * | 6/2016 | Kuranami | ............... | H04L 43/50 709/224 |
| 2018/0114271 A1 * | 4/2018 | Jhoney | ................ | G06F 11/0751 |
| 2019/0173964 A1 * | 6/2019 | Ni | ....................... | H04L 41/5019 |

* cited by examiner

*Primary Examiner* — Jigar P Patel
(74) *Attorney, Agent, or Firm* — Klarquist Sparkman, LLP (57) ABSTRACT

The present invention relates to a system and a method for automatic fault diagnosis, troubleshooting and resolution recommendations in a data center comprising one or more resources. The method comprises at least one collector unit [102] collecting a first data from one or more resources of the data center. A mapping unit [104] identifies a failure impact on the one or more resources based on the first data collected by the at least one collector unit. The central module unit [110] creates a detailed relationship map for the one or more virtual and physical resources based on the identified failure impact. A fault processor [106] automatically diagnoses the data center on occurrence of a fault based on the relationship map, and troubleshoots at least one of the one or more resources based on the diagnosis.

13 Claims, 7 Drawing Sheets

SYSTEM AND METHOD OF MAPPING AND DIAGNOSTICS OF DATA CENTER RESOURCES

CROSS REFERENCE TO RELATED APPLICATIONS

This application claims priority to Indian Patent Application No. 201921030943, filed Jul. 31, 2019, the disclosure of which is hereby incorporated by reference in its entirety.

TECHNICAL FIELD

The present disclosure relates generally relates to computer networks, and particularly relates to a system and a method for automatic fault diagnosis and troubleshooting in a data center.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The computers have evolved into extremely complicated devices since then. Today's computers are much more sophisticated than early systems such as the EDVAC. Computers typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computers today that are much more powerful than just a few years ago.

In recent years, there has been an increasing trend in the use of consumer electronic devices and, accordingly, an increasing trend is witnessed in the use of internet, applications and cloud data centers. As the Internet gets cheaper to use, Internet Applications are pervasively used, traffic patterns in networks are going to be more unpredictable, dramatically changed significantly in the last few years. Many consumer electronic devices such as mobile devices, smartphones, personal digital assistants, laptops, tablets, etc. are widely used for both personal and business purposes. Devices may include but not limited to hardware, firmware and/or software, and can take any of a variety of form factors. Typical examples of such form factors include laptops, smartphones, small form factor personal computers, personal digital assistants, rackmount devices, standalone devices, and so on. The functionality described herein also can be embodied in peripherals or add-in cards. Such functionality can also be implemented on a circuit board among different chips or different processes executing in a single device, by way of further example.

The extensive use of electronic devices has resulted in high traffic of application through the "native applications" that are either pre-installed or downloaded and installed, in an electronic device through the cloud to the data centers. As end-user applications (or clients applications for such an enterprise application) grow and usage increase with the devices, there are very common scenarios of traffic surge both at the client-side as well as the server-side. Also, with various enterprise applications and customers using the cloud for storage, and compute, the cloud is getting enormous day by day.

Hence, along with the growth of digital services and devices, the typical cloud data center environment has grown. The storage systems today are often organized in data centers. Such data centers may contain hundreds or thousands of computers. There is a large collection of interconnected servers that provide computing and/or storage capacity to run various applications. A data center may comprise a facility that hosts applications and services for subscribers, i.e., customers or users of data center. The data center may, for example, host all the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the globe with subscriber support equipment located in various physical hosting facilities. Many data centers today are dependent on the physical infrastructure of a particular data center. A data center can be modelled as rows of racks that house electronic systems, such as computing systems or other types of electrical devices. The computing systems (such as computers, storage devices, servers, routers, networking devices, etc.) consume power for their operation. The computing systems of the data center may reside in these racks. In a typical data center, there may be dozens or even hundreds of electrical devices. Each of these devices is connected to an electrical power source.

With the advent of cloud computing applications in the data center, computing-as a-utility has become a reality. By outsourcing computing also to the cloud or data center, the utility computing frees businesses and consumers from the cost and burden of planning, purchasing, operating, and maintaining physical hardware and software, and at the same time, it offers elasticity to meet dynamic demands in resources and good economy with a pay-as-you-go billing model for data center. The resource allocation and Service Level Agreement (SLA) of today's utility computing are centered around computation (INR per hour per VM), storage (INR per GB per month), Internet tracking (INR per GB transferred), and the availability of these resources in the data centers.

In recent years, as data centers have grown in size and complexity, the mapping tools that manage them must be able to effectively identify fault and inefficiencies while implementing appropriate mapping policies. Traditionally, network administrators have to manually implement mapping policies, manage mapping access control lists (MA-CLs), configure lists, map misconfigured or infected machines, diagnose the infected resources, etc. These tasks can become exponentially more complicated as a network grows in size and require an intimate knowledge of a large number of data center components. Furthermore, misconfigured machines can shut down a data center within minutes while it could take a network administrator hours or days to map and determine the root problem and provide a solution.

In the current scenario, also any troubleshooting in the cloud is very tedious due to the fact that virtual to physical relationships are either partially mapped or not mapped at all. The operator has to execute huge amounts of steps and process large data to come to a proper root cause analysis. The impact of any virtual or physical component failure is understood only after failure and cannot be understood before in the current scenario. The current technology landscape does not provide clear relationship maps between all virtual components to all physical components and does not include the linkages from the smallest physical infrastructure assets to the top-level deployments of containerized applications, Virtual Network Functions, Virtual Machines, containers, containerized assets and Virtual Machine Assets such as storage volumes, network connection points etc. Also, there are no solutions available to map the linkages and impact associated which could allow operators to identify and remediate any cloud issues quickly and with unprecedented accuracy.

The existing art describe a solution for identifying and alerting of an ongoing attack and monitoring status of the datacenter to map physical to virtual resources being used in the cloud environment on a broad level. This application includes monitoring of VMs and hypervisors, but it does not in any way attempt to map or co-relate virtual and physical resources. The sole intention is to monitor for any security-related anomalies. The mapping mentioned in the above system is meant to identify any mapping between incidents, traffic flows to probable security attacks on the datacenter. Another existing solution provides for a virtual cloud storage overlay. Yet another existing solution network multi-tenancy on the same server in a cloud that allows for a virtual switch which shall logically segment networking for multiple tenants on the same server. Yet another existing solution describes providing for the creation of multiple virtual data centers from single physical infrastructure.

In general, all the above-cited prior arts have the limitation of not providing solution to the problem of troubleshooting in the cloud which is very tedious since virtual to physical relationships are not mapped. The operator has to execute huge amounts of steps and process large data to come to a proper root cause analysis. The impact of any virtual or physical component failure is understood only after failure and cannot be understood beforehand in the current scenario. The current technology landscape does not provide relationship mapping between all virtual components to all physical components and does not include the linkages from the smallest physical infrastructure assets to the top-level deployments of containerized applications, Virtual Network Functions, Virtual Machines, containers, containerized assets and Virtual Machine Assets such as storage volumes, network connection points etc. Also, there are no solutions available to map the linkages and impact associated which could allow operators to identify and remediate any cloud issues quickly and with unprecedented accuracy.

Therefore, there is a need in the art that provides solution to the above problem that is of troubleshooting solution in the cloud for the data centers which is very tedious since virtual to physical relationships are either partially mapped or not mapped at all. Since, the operator has to execute huge amounts of steps and process large data to come to a proper root cause analysis as the current technology solution does not provide clear relationship maps between all virtual components to all physical components and does not include the linkages from the smallest physical infrastructure assets to the top-level deployments of containerized applications, Virtual Network Functions, Virtual Machines, containers, containerized assets and Virtual Machine Assets such as storage volumes, network connection points etc. Also, there are no solutions available to map the linkages and impact associated which could allow operators to identify and remediate any cloud issues quickly and with unprecedented accuracy for the data centers.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a system and a method for automatic fault diagnosis and troubleshooting in a data center. Another object of the present invention is to provide a method and a system to provide clear relationship mapping between all virtual components to all physical components and include the linkages from the smallest physical infrastructure assets to the top-level deployments of containerized applications, Virtual Network Functions, Virtual Machines, containers, containerized assets and Virtual Machine Assets such as storage volumes, network connection points etc. Yet another object of the present invention is to provide solutions to map the linkages and impact associated which could allow operators to identify and remediate any cloud issues quickly and with unprecedented accuracy for the data centers. Yet another object of the present invention is to provide a system and a method for troubleshooting in the cloud for the data centers which is very tedious since virtual to physical relationships are either partially mapped or not mapped at all. Yet another object of the present invention is to provide a system and a method to reduce the amount of time that would have otherwise been used to communicate to search and retrieve the required information thereby drastic reduction in MTTR for cloud-related issues and increase the efficiency of network operation.

In order to achieve at least some of the above-mentioned objectives, the present invention provides a method and system for automatic fault diagnosis and troubleshooting in a data center comprising one or more resources. A first aspect of the present invention relates to a method for automatic fault diagnosis and troubleshooting in a data center comprising one or more resources. The method comprises at least one collector unit collecting a first data from the one or more resources of the data center. Next, a mapping unit identifies a failure impact on the one or more resources based on the first data collected by the at least one collector unit. Subsequently, the mapping unit creates a relationship map for the one or more resources based on the identified failure impact. Next, a fault processor automatically diagnoses the data center on occurrence of a fault based on the relationship map. Lastly, the fault processor troubleshoots at least one of the one or more resources based on the diagnosis of the data center.

Another aspect of the present invention relates to a system for automatic fault diagnosis and troubleshooting in a data center comprising one or more resources. The system comprises at least one collector unit, a mapping unit and a fault processor, all the components connected to each other and working in conjunction to achieve the objectives of the present invention. The at least one collector unit is configured to collect a first data from the one or more resources of the data center. The mapping unit is configured to identify a failure impact on the one or more resources based on the first data collected by the at least one collector unit. The mapping unit is also configured to create a relationship map for the one or more resources based on the identified failure impact. The fault processor is configured to automatically diagnoses the data center on the occurrence of a fault based on the relationship map. The fault processor is further configured to troubleshoot at least one of the one or more resources based on the diagnosis of the data center.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that invention of such drawings includes the invention of electrical components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the invention. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infers" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present invention. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. 'Computer storage media' refers to volatile and non-volatile, removable and non-removable media implemented in any method or technology for storage of information Such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present invention. More specifically, the controller or control unit is a hardware processor that comprises a memory and a processor. The memory is configured to store the modules and the processor is specifically configured to execute said modules to perform one or more processes which are described further below.

As used herein, the terms "electronics rack", "rack-mounted electronic equipment", and "rack unit" are used interchangeably, and unless otherwise specified include any housing, frame, rack, compartment, blade server system, etc., having one or more heat generating components of a computer system or electronics system, and may be, for example, a standalone computer processor having high, mid or low end processing capability. An electronics rack comprises at least one electronics subsystem.

As used herein, "Electronics subsystem" refers to any sub-housing, blade, book, drawer, node, compartment, etc., having one or more electronic components disposed therein. Each electronics subsystem of an electronics rack may be movable or fixed relative to the rack unit, with the electronics drawers of a multi-drawer rack unit and blades of a blade center system being two examples of electronics subsystems of an electronics rack.

As used herein, a "server" refers generally to a multi-user computer that provides a service (e.g. database access, file transfer, remote access) or resources (e.g. file space) over a network connection. The term "server" as the context requires, refers inclusively to the server's computer hardware as well as any server application software or operating system software running on the server. As used herein, a "server application" is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

As used herein, a "Data Center" or "Cloud" refers to a network or networked data center comprising a group of computers, storage devices, running machine executable program instructions or storing or processing machine storable digital data, network, etc. In addition, "data center" refers to a computer installation to contain one or more electronics racks. As a specific example, a data center may be designed to contain one or more rows of rack-mounted electronic equipment, such as server units. A Private cloud is a private implementation of an enterprise for its own use. It can also be hosted in a third-party provider, but is owned and managed by the customer, alternatively referred to as client machines. Public cloud is hosted, owned and managed by the third-party provider. Hybrid and federated cloud are different amalgamation/union of private and public clouds in accordance with the policies of the service providers involved. The hosted private cloud storage is dedicated, third-party managed cloud storage, owned by customer or service provider.

As used herein, a "File server" is a server machine where it runs a standard network File Access Protocol (FAS). The file access is issued by any computer connected to IP network that performs file access over CIFS/NFS protocol.

As used herein, "RAID" refers to data protection technology where different blocks of data are mirrored, stripped or double distributed parity, so that if any one or more disks fail, data is still recoverable. There are various types of RAID. RAID 0 is a simple stripping where different blocks of data is stripped into various strips and written into different disks. RAID 1 implements mirroring. RAID 5, 6 all involve block-level striping with double distributed parity. There are other enhancements like erasure-coded RAID.

As used herein, "Blade servers" are self-contained servers, designed for high density. A blade enclosure provides services such as power, cooling, networking, various interconnects and management—though different blade providers have differing principles around what should and should not be included in the blade itself—and sometimes in the enclosure altogether.

Together, a set of blade servers installed in a blade enclosure or 'blade center' for a blade system. Components such as processors, memory, hard drives, power supplies, storage and network connections, keyboards, video components, a mouse, and so on, merely support the basic computing function and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

As used herein, "Cloud Storage hypervisor" or "Cloud file" is the file stored in the cloud storage. Cloud file virtualization involves virtualizing access to cloud file in a way that transparently redirect the file access.

As used herein, "Cloud Proxy Server" or a "proxy", also a computer system, intercepts traffic over the Local Area Networks, Wide Area Network or internet and does some processing and then redirects the request to another server, receives the request back and sends back the request back to the original client. In the context of disclosure, the proxy here intercepts all the traffic between the client and to a destination cloud, hence called cloud proxy. In one embodiment, the cloud proxy is one or more instances of any form of network computer systems or any single computer system having the ability to receive and transmit data across any standard network interface.

As used herein, "virtual machine" refers to a computing environment created by abstracting resources from a physical machine, such that the VM runs a dedicated operating system on shared physical hardware resources. In an instance, multiple VM environments co-exist simultaneously on the same physical hardware resource, isolated from each other. As used herein, "container" refers to a virtual runtime environment running on top of a physical server and single operating system kernel and emulating the operating system for virtually packaging and isolating applications for deployment.

The present invention provides a system and a method to provide relationship maps between all virtual components to all physical components including the linkages from the smallest physical infrastructure assets to the top-level deployments of containerized applications, Virtual Network Functions, Virtual Machines, containers, containerized assets and Virtual Machine Assets such as storage volumes, network connection points etc. The present invention provides solutions to map the linkages and impact associated which could allow operators to identify and remediate any cloud issues quickly and with unprecedented accuracy for the data centers.

Figure 1:
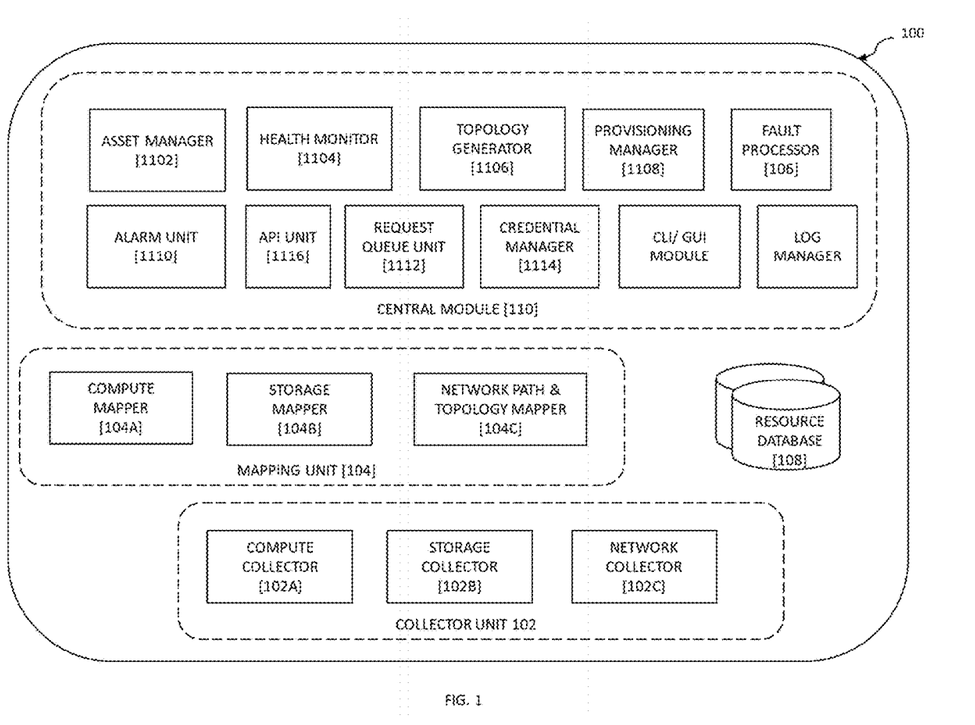
FIG. 1 illustrates an exemplary block diagram representation of a system [100] for automatic fault diagnosis and troubleshooting in a data center, in accordance with exemplary embodiments of the present invention.

Referring to FIG. 1 illustrates an exemplary block diagram representation of a system [100] for automatic fault diagnosis and troubleshooting in a data center, in accordance with exemplary embodiments of the present invention. The system [100] fetches all cloud deployment hardware details from cloud deployer (OSI, under-cloud, cloud director etc.), details including Server E2E specifications, identifiers, management IPs, hardware components information and management methods. For instance, the system [100] fetches hardware information from servers using CLI, API, SNMP, IPMI, iDRAC, ILO and other management protocols. The system [100] also fetches storage information, for e.g., software-based and hardware-based storages using CLI, API, SNMP, IPMI, iDRAC, iLO and other management protocols. The system [100] fetches all network information from SDN controllers, Routers, switches, TORs, APIC and any other network entities using CLI, API, SNMP, net flows and other management protocols. The system [100] can collect logs and inputs from multiple VIM services. The system [100] catalogues all virtual and physical inventory down to its smallest components, and builds mapping, path and topology based on logs and inputs collected from the computing resource, storage resource and the networking resource. The system [100], thus, creates relationships between the virtual and physical resources using all the logs and inputs collected from VIMs, VNFMs, NFVIs and hardware entities. The system [100] also generates impact reports, impacts chains and domains based on collected logs and inputs.

The system [100] comprises at least one collector unit [102], a mapping unit [104] and central module [110], all the components connected to each other and working in conjunction to achieve the objectives of the present invention. The one or more resources is one of a computing resource, a networking resource and a storage resource.

The at least one collector unit [102] is configured to dynamically collect a first data from the one or more resources of the data center. In operation, the at least one collector unit [102] is configured to collect first data (also referred to as "information") from various resources being the computing resource, the networking resource and the storage resource.

In an instance of the present invention, the at least one collector unit [102] comprises at least one of a computing collector [102A], a networking collector [102B] and a storage collector [102C]. The computing collector [102A] is configured to dynamically collect the first data from each of the at least one computing resource. The computing collector [102A, 300A] is described in detail below with reference to FIG. 3. The networking collector [102B] is configured to dynamically collect the first data from each of the at least one networking resource. The networking collector [102B, 300B] is described in detail below with reference to FIG. 3. The storage collector [102C] configured to dynamically collect the first data from each of the at least one storing resource. The storage collector [102C, 300C] is described in detail below with reference to FIG. 3.

The mapping unit [104] is configured to identify a failure impact on the one or more resources based on the first data collected by the at least one collector unit [102], and to create a relationship map for the one or more resources based on the identified failure impact. The relationship maps depict a detailed relationship mapping of the resources based on the criticality and impact on failure. In an instance of the present invention, the mapping unit [104] is further configured to determine one or more past fault occurrence on the one or more resources from the first data, and to analyze the failure impact for each of the one or more resources based on the past fault occurrence.

In another instance of the present invention, the mapping unit [104] determines a network topology for the data center, wherein the network topology comprises of one or more connecting path between the one or more resources. It identifies dependencies between the one or more resources, wherein the relationship map is created based on the identified dependencies. The mapping unit [104] is also configured to continuously update the relationship map for the one or more resources based on the collected first data. In another instance of the present invention, the mapping unit [104] comprises of a compute mapper [104A], a network mapper [10413] and a storage mapper [104C]. The compute mapper [104A, 400A], the network mapper [10413, 40013] and the storage mapper [104C, 400C] are described in detail below with reference to FIG. 4.

The central module [110] comprises of an asset manager [1102], a health monitor [1104], a topology generator [1106], a fault processor [106], an alarm unit [1110], a request queue unit [1112], a credential manager [1114], a log manager [1118], a provisioning manager [1108], a CLI/GUI module [1120] and an API unit [1116]. The said components hosted by the central module [110] are jointly accessed, used and shared by all other modules for various purposes in parallel while maintaining data integrity. The asset manager [1102] is configured to maintain a list of asset (or component) for the entire data center infrastructure. It is also configured to update the list of resources based on communication will all other modules. The health monitor [1104] is configured to parse dynamically collected first data received from the collector unit [102] and generate a measure of key performing indicators. It is also configured to maintain a regular health check on the data center infrastructure based on the logs, thresholds and monitoring reports.

The topology generator [1106] is configured to maintain a real-time live relationship mapping based on the collected first data and corresponding mapping created by the three mappers. The provisioning manager [1108] is responsible for configuration management, application deployment, intraservice orchestration, and provisioning of various other sub-modules of the central module [110]. The alarm unit [1110] is configured to maintain and notify any alarms, critical events and actions that have happened in the entire system [100]. The API unit [1116] hosts the API endpoint and the entire API functionality as a whole for the entire system [100]. The request queue unit [1112] maintains data integrity by making use of request queues when any data needs to create, update or delete operation. The credential manager [1114] is configured to collect logs and run, read information commands via terminal etc. that require credentials/keys. It maintains safeguard using latest security methods and as per policies using this sub-module. It also operates as an authentication and authorization sub-module. The CLI/GUI module [1120] presents a CLI terminal to work on the system [100] and also provides a feature-rich and easily navigable GUI. The log manager [1118] is configured to maintain end to end logs of the system [100]. The fault processor [106] is configured to automatically diagnose the data center on occurrence of a fault based on the relationship map, and to troubleshoot at least one of the one or more resources based on the diagnosis.

Figure 2:
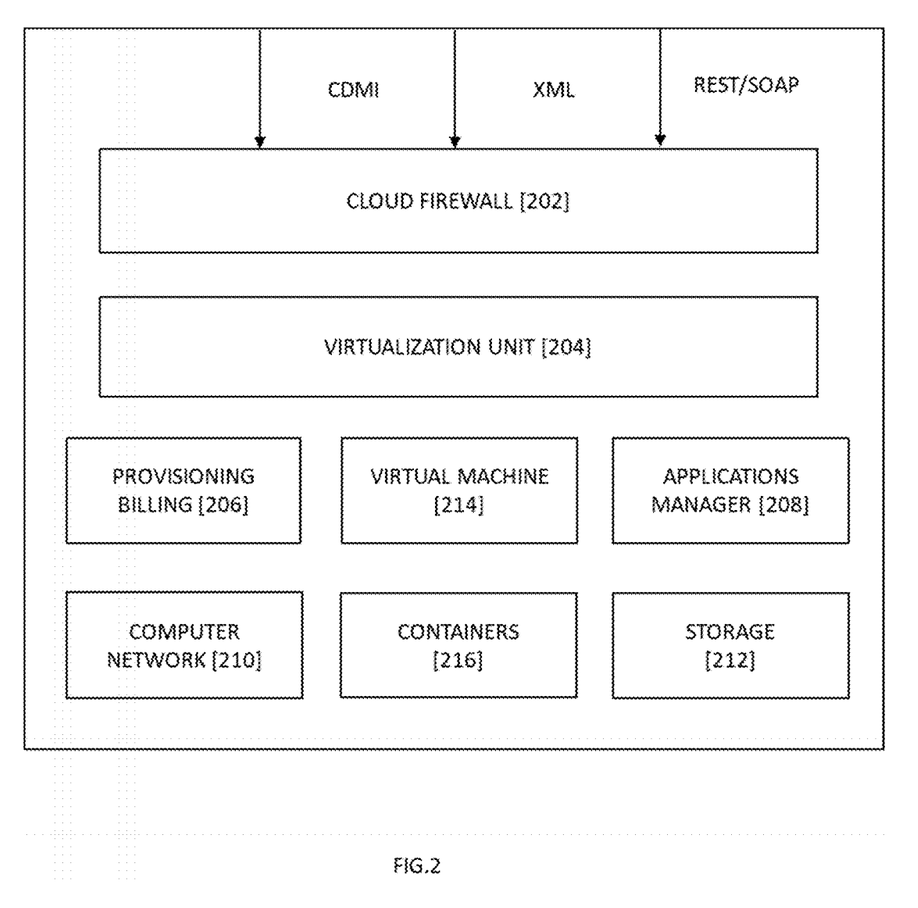
FIG. 2 illustrates an exemplary block diagram representation of a data center [200], in accordance with exemplary embodiments of the present invention.

Referring to FIG. 2 illustrates an exemplary block diagram representation of a data center [200], in accordance with exemplary embodiments of the present invention. The data center [200] comprises of a cloud firewall [202], a virtualization unit [204], a provisioning and billing unit [206], an applications manager [208], a computer network [210], one or more virtual machines [214], one or more containers [216] and a storage [212], said components are connected to each other and work in conjunction with each other to achieve the objectives of the present invention. In operation, the data access is first received by the cloud firewall [202], followed by the virtualization layer [204] processing the application traffic. The provisioning and billing unit [206] processes provisioning requests and performs billing for the accessed resources. The virtualization unit [204] is configured to virtualize physical resources. In instances of cloud computing, the virtualization unit [204] acts as a hypervisor. In instances of cloud storage, the virtualization unit [204] is a file virtualization layer that virtualizes the underlying file servers of the computer network [210]. The data center [200] may further comprise of comprising one or more virtual machines [214], one or more containers [216], storage [212], etc.

Figure 3:
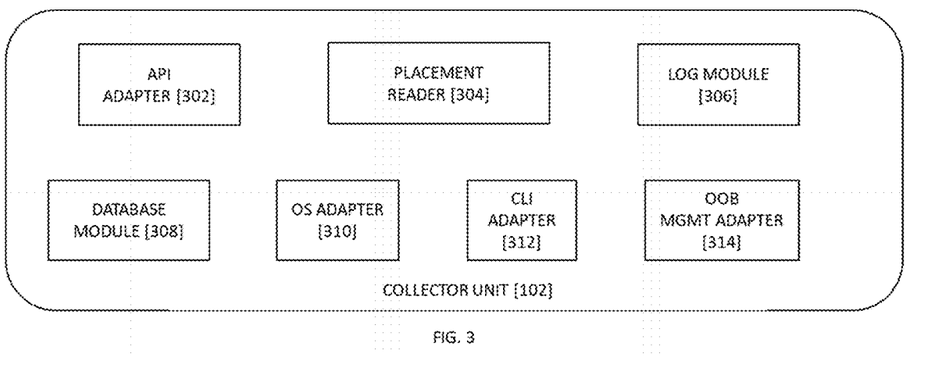
FIG. 3 illustrates an exemplary block diagram representation of a collector unit, in accordance with exemplary embodiments of the present invention.

Referring to FIG. 3 illustrates an exemplary block diagram representation of a collector unit [102], in accordance with exemplary embodiments of the present invention. In an instance of the present invention, the at least one collector unit [102] comprises of a cloud API adapter [302] configured to collect all the information necessary for determining relationships, impacts. In an instance of the present invention, the at least one collector unit [102] comprises of a placement reader [304] configured to glean initial information about the at least one computing resource (e.g., containers, virtual machines, etc.) and its placement with respect to the storage resource (e.g., physical servers). In an instance of the present invention, the at least one collector unit [102] comprises of a log module [306] configured to maintain logs for the at least one collector unit [102] and to synchronize the at least one collector unit [102] with the central module [110].

In another instance of the present invention, the at least one collector unit [102] comprises of a database module [308] configured to handle all the database read and write operations. In another instance of the present invention, the at least one collector unit [102] comprises of an OS adapter [310] configured to handle all the operations that need to be carried out on any operating system [100]. In another instance of the present invention, the at least one collector unit [102] comprises of a CLI adapter [312] configured to handle operations and commands that need to be carried out on any terminal via CLI. In an instance of the present invention, the at least one collector unit [102] comprises of a managing OOB adapter [314] configured to manage OOB operations for various protocols such as iLO, iDRAC, iBMC etc.

The at least one collector unit [102] is one of a compute collector [300A], a network collector [300B] and a storage collector [300C]. The compute collector [300A] is configured to collect logs and inputs from the computing resources, such as cloud deployers/managers, cloud compute server hardware, hypervisors, Virtualized Infrastructure Managers (VIM), Containers, and Management and Orchestration (MANO) unit. The network collector [300B] is configured to collect logs and inputs from all network resources like routers, switches, TORs, Network Entitlement Management System (NEMS), Network Services Orchestrator (NSO), VIMs, Software-defined networks (SDN), Internet Protocol Address Management (IPAM), cabling design, etc. The storage collector [300C] is configured to collect logs and inputs from all storage resources, for example, storage-based cloud deployers/managers, storage server hardware, physical storages, hypervisors, Containers, VIMs, MANO, software-defined storages, etc.

Figure 4:
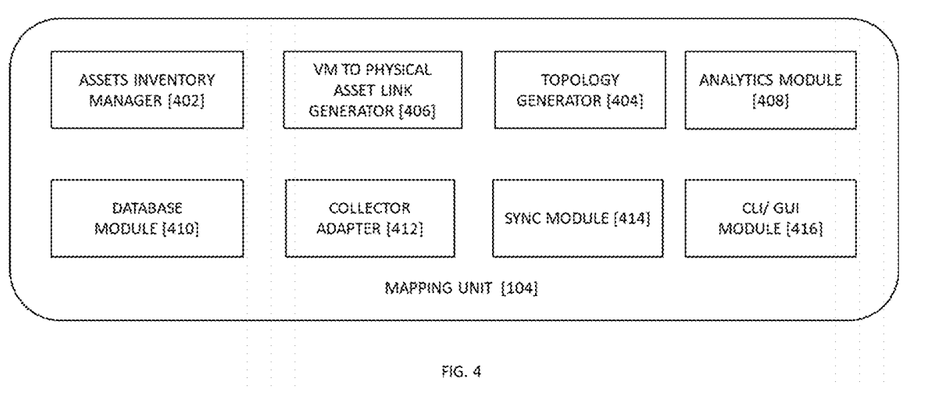
FIG. 4 illustrates an exemplary block diagram representation of a mapping unit, in accordance with exemplary embodiments of the present invention.

Referring to FIG. 4 illustrates an exemplary block diagram representation of a mapping unit [104], in accordance with exemplary embodiments of the present invention. In an instance, the mapping unit [104] comprises of an asset inventory manager configured to maintain a list of physical and virtual components and assets along with each components' attributes, and to assign a unique identifier to the components. The mapping unit [104] comprises of a topology generator [1106] configured to run method flows to determine relationships, to generate maps based on above info. The topology generator [1106] is also configured to maintain relationships between resources, relationship map, dependency on chart, dependency of charts, failure criticality, failure impact domain and failure impact level of its respective components. The mapping unit [104] further comprises of an analytics module configured to process the first data to determine relationships, impacts, impacts domains and failure criticality.

The mapping unit [104] further comprises of a database module is configured to perform read and write operations. The mapping unit [104] further comprises of collector adapters is configured to communicate with other components and adapters of the mapping unit [104] for data CRUD operations. The mapping unit [104] further comprises of a sync Module configured to ensure that the databases are in synchronization with the latest data from various modules and sub-modules, and to update the relationship map with the latest data. The mapping unit [104] further comprises of a CLI/GUI frontend module.

The compute mapper [400A] is configured to map end to end computing resource (e.g., containers, microservices, VMs, etc.) to hardware computing resource chain down to the smallest component. The compute mapper [400A] is also configured to create failure impact links and domains. The compute mapper [400A] is configured to create resource-specific link topology map and end to end-link topology map along with updating the said maps in real-time. The network mapper [40013] is configured to map the end to end container and VM network to physical, overlay and underlay network resource chain, including but not limited to, VLAN, VXLAN, IPv4, IPv6 and MAC address details, etc. The network mapper [40013] is also configured to create failure impact links and domains. The network mapper [40013] is also configured to create resource-specific link topology map and end to end-link topology map along with updating the said maps in real-time. The storage mapper [400C] is configured to map the end to end container, VM compute and operating system resource chain. The storage mapper [400C] is also configured to create failure impact links and domains. The storage mapper [400C] is also configured to create resource-specific link topology map and end to end-link topology map along with updating the said maps in real-time.

Figure 5:
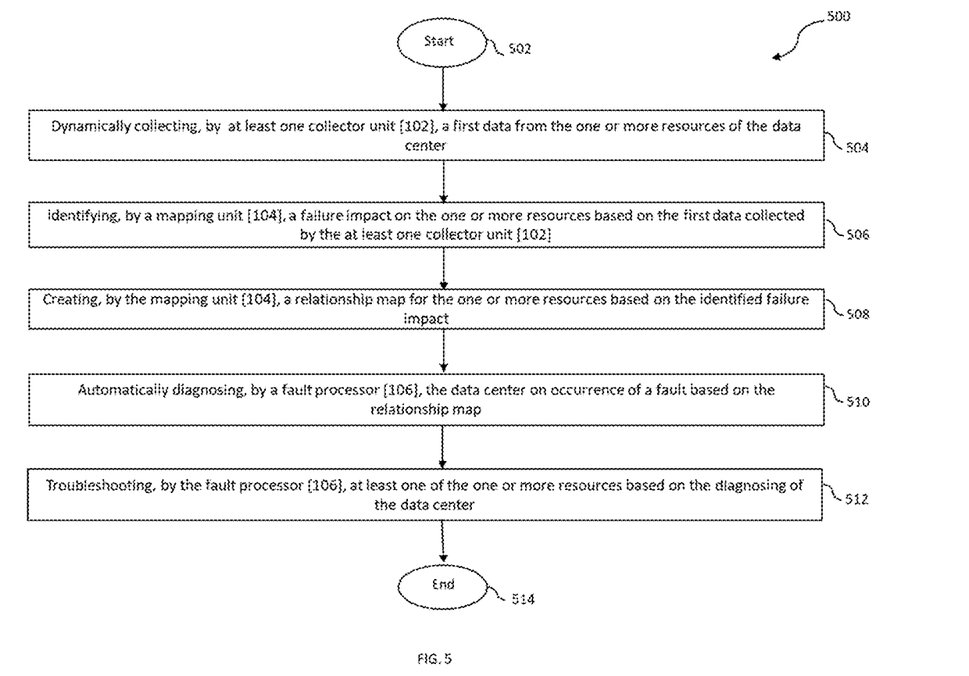
FIG. 5 illustrates an exemplary method flow diagram depicting a method [500] for automatic fault diagnosis and troubleshooting in a data center, in accordance with exemplary embodiments of the present invention.

Referring to FIG. 5 illustrates an exemplary method flow diagram depicting a method [500] for automatic fault diagnosis and troubleshooting in a data center, in accordance with exemplary embodiments of the present invention. The method starts at step [502]. At step [504], the method comprises dynamically collecting, by at least one collector unit [102], a first data from the one or more resources of the data center. The one or more resources is one of a computing resource, a networking resource and a storage resource. In an instance of the present invention, the at least one collector unit [102] further comprises dynamically collecting, by a computing collector, the first data from each of the at least one computing resource, dynamically collecting, by a networking collector, the first data from each of the at least one networking resource, and dynamically collecting, by a storage collector, the first data from each of the at least one storing resource.

At step [506], a mapping unit [104] identifies a failure impact on the one or more resources based on the first data collected by the at least one collector unit [102]. In an instance of the present invention, the mapping unit [104] determines one or more past fault occurrence on the one or more resources from the first data and analyses the failure impact for each of the one or more resources based on the past fault occurrence.

At step [508], the mapping unit [104] creates a relationship map for the one or more resources based on the identified failure impact. In an instance of the present invention, the mapping unit [104] determines a network topology for the data center, wherein the network topology comprises of one or more connecting path between the one or more resources. The mapping unit [104] identifies dependencies between the one or more resources, wherein the relationship map is created based on the identified dependencies. The mapping unit [104] also continuously updates the relationship map for the one or more resources based on the collected first data.

At step [510], the fault processor [106] automatically diagnoses the data center on occurrence of a fault based on the relationship map. Lastly, at step [512], the fault processor [106] troubleshoots at least one of the one or more resources based on the diagnosis. The method completes at step [514]. In another instance, the present invention encompasses dynamically updating the first data for the one or more resources in a resource database [108].

Figure 6:
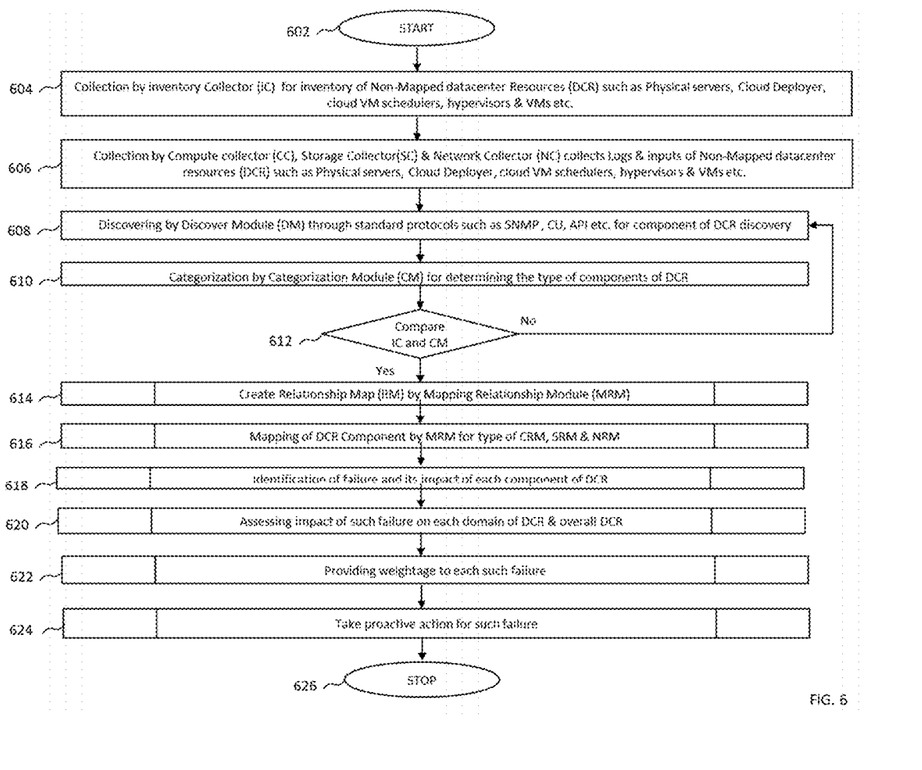
FIG. 6 illustrates an exemplary signal flow diagram depicting a method for automatic fault diagnosis and troubleshooting in a data center, in accordance with exemplary embodiments of the present invention.

Referring to FIG. 6 illustrates an exemplary signal flow diagram depicting a method for automatic fault diagnosis and troubleshooting in a data center, in accordance with exemplary embodiments of the present invention. The method starts at step [602]. At step [604], the method includes mapping the hardware components of a server or chassis to the end containers and VMs that reside logically on an open-stack cloud. An inventory collector [102] collects a first data for non-mapped data center resources such as physical servers, cloud deployer, cloud VM schedulers, hypervisors, containers, VMs etc. At step [606], the compute collector [102A], the storage collector [102C] and the network collector [102B] collect logs and inputs of non-mapped data center resources (DCR) such as Physical servers, Cloud Deployer, cloud VM schedulers, hypervisors, containers, VMs, etc. For instance, the compute collector [102A] collects logs from the server/chassis hardware, cloud placement manager, etc. following components using any system log collection tool such as syslog, API calls and Ansible playbooks which have CLI scripts.

The API adapter [302] of the collector unit [102] shall via API, lists the following details: list of all VMs running, list of all containers, list of all compute resource hardware, details of each VM, details of each container, details of each computing resource. The system log protocol collection tool that run via compute collector [102A] provide details regarding hardware components including but not limited to CPUs, RAM, RAM, HDDs, SSDs, Network interfaces, PCI cards, Power supplies, Fans, etc. The log module [306] and database module [306] index these details in the database.

At step [608], a discovery module [1122] (not shown in the figure) of the central module [110] through standard protocols such as SNMP, CU, API etc. for component of DCR discovery. At step [610], a categorization module determines the type of components of DCR, and at step [612], the first data from the inventor collector [102] and the compute mapper [104A] are compared. In the event the first data matches, the method proceeds to step [614], a mapping unit [114] creates a relationship map. At step [616], the method comprises mapping of DCR Component by the mapping unit [114] based on the type, for e.g., mapping by compute mapper, storage mapper and network mapper. At step [618], upon identification of failure, a fault processor [106] determines impact on each component of DCR. At step [620], impact of such failure on each domain of DCR & overall DCR is assessed. At step [622], a weightage is provided to each such failure, and at step [624], a proactive action is taken for such failure based on the relationship map. The method completes at step [626].

The present invention also encompasses that the synchronization module [414] of the mapping unit [104] collects all the collected logs and inputs from the at least one collector [102] and starts creating/updating their own data. All the physical and virtual components of all hardware and clouds are catalogued with details and tags. Each asset is given Unique ID. The present invention also encompasses that the analytics module [408] of the mapping unit [104] post-processes all the logs and inputs using various methods including, but not limited to, containers and VMs to host mapping available in the OS, servers and its component list available via server management protocols such as iLO, iBMC, redfish, API, CLI etc., virtual components and its details available at cloud deployers, cloud managers, cloud directors, orchestrators etc. and various neighbor discovery protocols, packet analysis etc.

The present invention also encompasses a VM/container to Physical asset Link Generator configured to create a detailed multilink and multi-hop relationships relationship map, dependency on chart, dependency of chart, failure criticality, failure impact domain and failure impact level for each component/asset in its inventory based on logs and inputs from the analytics module. Each asset, be it a container, a VM, physical compute host, a power module or fan will have its independent relationship map, dependency on chart, dependency of chart, failure criticality, failure impact domain and failure impact level. This shall be populated in the database. The topology generator [1106] along with the CLI (command line interface) and GUI (Graphical user interface) module creates detailed maps based on the above logs and inputs for the standalone and end to end assets. The data is available to consume via CLI, GUI and API.

In another embodiment, the asset and inventory lists maintained by the system [100] encompass all identifiable components of the physical and virtual infrastructure with the component attribute are listed below. The relationships, correlations, dependencies, impacts and pre-requisites are mapped in detail for each of these resources with their attributes. The attributes of the resources include, but are not limited to, make and model details, serial number/ID, batch number, type, unique id, code, version number, patch number, UUID, tag, cloud id, detailed location, detailed name, FQDN, hostname, IP, MAC, IMEI, MISISDN, Owner, OEM, profile, socket/port, dimensions and name. These resources include, but are not limited to, Cloud Infrastructure; Containers, CNFs (Container Network Functions), CNFCs (Container Network Function Components), containerized applications, containerized assets; Virtual machines, VNFs, VNFCs and its components; Virtual machine assets e.g. CPU, RAM, Storage; Virtual machine Networking assets e.g. IP, Networks, Interfaces, Sockets; Operating system components e.g., Programs, installed software, kernel, middleware, drivers etc.; Operating system [metrics; Servers; Chassis; HDDs, SSDs, Micro SSDs, M2 disks and other forms of storages; CPU; RAM; PCI cards; Motherboard; Server/Chassis Interface Cards; Onboard Network Ports; RAID Controllers; DISK Array Controllers; HBA/FC/InfiniBand Ports; SR-IOV and DPDK Modules and Ports; Intelligent NICs; Power Modules; Onboard and Internal sensors, e.g. temperature, humidity, power etc.; External Sensors, e.g. temperature, humidity, power etc.; Physical and Virtual Network Switches and their components; Physical and Virtual Network Routers and their components; Physical and Virtual Network Firewalls and their components; Physical and Virtual Switch/Router/Firewall interfaces and endpoints; Physical and Virtual Switch/Router/Firewall virtual contexts and instances; Physical and Virtual Switch/Router/Firewall virtual interfaces, VLANs, VXLANs; Physical and Virtual Switch/Router/Firewall logical assets e.g. IPv4, IPv6, names, zones; SDN based Network Switch/Router/Firewall components; SDN based Network Switch/Router/Firewall interfaces and assets; SDN based Network Switch/Router/Firewall logical assets such as IPv4, IPv6 etc.; SDN based Network Switch/Router/Firewall logical assets such as VLANs, VXLANs, names, Domains, contexts, zones etc.; Virtual and Physical Load Balancers and it's logical and physical assets and inventory; Virtual and Physical DNS, NTP, AD, LDAP, ACS, AAA, Proxy and other support elements, their logical and physical assets and inventory; Physical and Virtual SAN and NAS storages and all its hardware components such as SSDs, HDDs, CPU, RAM, interfaces etc.; Physical and Virtual SAN, NAS logical components e.g. Domains, Zones, Virtual disks, etc.; all physical and Virtual NOC and Asset inventory tools; Storage controllers; SDN and Network Controllers; Automation Tools; Monitoring tools; Operations tools; Element Management systems; Containers, Dockers, Pods, Swarms, Kubelets, Servlets, micro-services, JVMs etc.; Serverless infrastructure and its components; Data centre Infrastructure and its components; PACs, Air Conditioners, AC and DC Power distribution units and their controllers; Endpoint connectivity devices and controllers e.g. Wi-Fi, Small Cells, WLCs, Pico Cells, Femto Cells etc.

Figure 7:
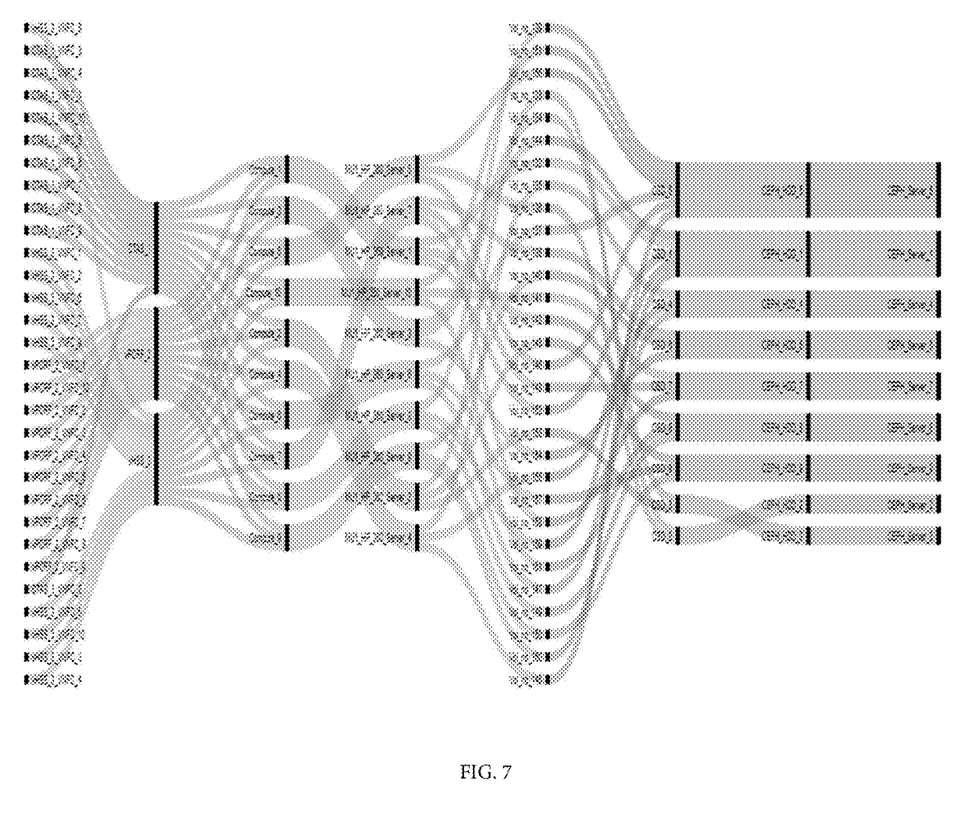
FIG. 7 illustrates an exemplary topology mapping, in accordance with exemplary embodiments of the present invention.

Referring to FIG. 7 illustrates an exemplary topology mapping, in accordance with exemplary embodiments of the present invention. Thus, the present invention provides a system and a method for automatic fault diagnosis and troubleshooting in a data center by providing a clear relationship mapping between all virtual components to all physical components and include the linkages from the smallest physical infrastructure assets to the top-level deployments of containerized applications, containers, Virtual Network Functions, Virtual Machines, container assets and Virtual Machine Assets such as storage volumes, network connection points etc. The present invention provides solution to map the linkages and impact associated which could allow operators to identify and remediate any cloud issues quickly and with unprecedented accuracy for the data centers, and to reduce the amount of time that would have otherwise been used to communicate to search and retrieve the required information thereby drastic reduction in MTTR for cloud related issues and increase efficiency of network operation.

The accompanying descriptions are for the purpose of providing a thorough explanation, with numerous specific details. The field of cloud and storage networking encompasses many different variations of the illustrated and described features of the present invention all of which are encompassed by the present invention. Those skilled in the art will thus undoubtedly appreciate that the disclosure can be practiced without some specific details described below, and indeed will see that many other variations and embodiments of the disclosure can be practiced while still satisfying its teachings and spirit. For example, although the present disclosures are described with reference to cloud mapping the storage, it can similarly be embodied in any form of utility/grid-based mapping storage clusters or data centers running various protocols.

The process features, or functions of the present disclosure can be implemented by program instructions that execute in an appropriate computing device. Computing devices include but not limiting to enterprise servers, application servers, work-stations, personal computers, network computers, network appliances, personal digital assistants, set-top boxes, and personal communication devices. The program instructions can be in any appropriate form, such as source code, object code, or scripts.

The interface, module, memory, database, processor and component depicted in the figures and described herein may be present in the form of a hardware, a software and a combination thereof. The connection shown between these components/module/interface in the system [100] are exemplary, and any components/module/interface in the system [100] may interact with each other through various logical links and/or physical links. Further, the components/module/interface may be connected in other possible ways.

Though a limited number of servers, gateways, user equipment, wireless network, interface, module, memory, database, processor and component have been shown in the figures, however, it will be appreciated by those skilled in the art that the overall system [100] of the present invention encompasses any number and varied types of the entities/elements such as servers, gateways, user equipment, wireless network, interface, module, memory, database, processor and any other component that may be required by a person skilled in the art to work the present invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for automatic fault diagnosing and troubleshooting in a data center comprising one or more resources, the method comprising:
dynamically collecting, by at least one collector unit, a first data from the one or more resources of the data center;
identifying, by a mapping unit, a failure impact on the one or more resources based on the first data collected by the at least one collector unit;
creating, by the mapping unit, a relationship map for the one or more resources based on the identified failure impact, wherein the relationship map depicts a detailed relationship mapping between all virtual components of the one or more resources to all physical components of the one or more resources based on the identified failure impact, wherein upon the creation of the relationship map, the one or more resources are mapped based on a type of the one or more resources;
automatically diagnosing, by a fault processor, the data center on occurrence of a fault based on the relationship map; and
troubleshooting, by the fault processor, at least one of the one or more resources based on the diagnosing of the data center.

2. The method as claimed in claim 1, wherein the one or more resources is one of a computing resource, a networking resource and a storage resource.

3. The method as claimed in claim 2, wherein dynamically collecting the first data from the one or more resources by the at least one collector unit further comprising:
dynamically collecting, by a computing collector, the first data from the computing resource;
dynamically collecting, by a networking collector, the first data from the networking resource; and
dynamically collecting, by a storage collector, the first data from the storing resource.

4. The method as claimed in claim 1, further comprising:
determining, by the mapping unit, a network topology for the data center, wherein the network topology comprises of one or more connecting path between the one or more resources;
identifying, by the mapping unit, dependencies between the one or more resources, wherein the relationship map is created based on the identified dependencies; and
continuously updating, by the mapping unit, the relationship map for the one or more resources based on the collected first data.

5. The method as claimed in claim 1, wherein identifying the failure impact on the one or more resources by the mapping unit further comprises:
determining one or more past fault occurrence on the one or more resources from the first data; and
analysing the failure impact for each of the one or more resources based on the past fault occurrence.

6. The method as claimed in claim 1, the method further comprising dynamically updating the first data for the one or more resources in a resource database.

7. A system for automatic fault diagnosing and troubleshooting in a data center comprising one or more resources, the system comprising:
at least one collector unit configured to dynamically collect a first data from the one or more resources of the data center;
a mapping unit connected to the at least one collector unit, said mapping unit configured to:
identify a failure impact on the one or more resources based on the first data collected by the at least one collector unit, and
create a relationship map for the one or more resources based on the identified failure impact, wherein the relationship map depicts a detailed relationship mapping between virtual components of the one or more resources to physical components of the one or more resources based on the identified failure impact, wherein upon the creation of the relationship map, the one or more resources are mapped based on a type of the one or more resources; and
a fault processor connected to the at least one collector unit and the mapping unit, said fault processor configured to:
automatically diagnose the data center on occurrence of a fault based on the relationship map, and troubleshoot at least one of the one or more resources based on the diagnosis of the data center.

8. The system as claimed in claim 7, wherein the one or more resources is one of a computing resource, a networking resource and a storage resource.

9. The system as claimed in claim 7, further comprising:
a computing collector configured to dynamically collect the first data from the computing resource;
a networking collector configured to dynamically collect the first data from the networking resource; and
a storage collector configured to dynamically collect the first data from the storing resource.

10. The system as claimed in claim 9, wherein the mapping unit is further configured to:
determine a network topology for the data center, wherein the network topology comprises of one or more connecting path between the one or more resources;
identify dependencies between the one or more resources, wherein the relationship map is created based on the identified dependencies; and
continuously update the relationship map for the one or more resources based on the collected first data.

11. The system as claimed in claim 7, wherein the mapping unit is further configured to:
determine one or more past fault occurrence on the one or more resources from the first data; and
analyse the failure impact for each of the one or more resources based on the past fault occurrence.

12. The system as claimed in claim 7, the system further comprising a resource database connected to the at least one collector unit, the mapping unit and the fault processor, said resource database configured to dynamically update the first data for the one or more resources.

13. One or more non-transitory computer-readable media comprising machine-executable instructions that, when executed by a computing system, cause the computing system to perform a method for automatic fault diagnosing and troubleshooting in a data center comprising one or more resources, the method comprising:
dynamically collecting, by at least one collector unit, a first data from the one or more resources of the data center;
identifying, by a mapping unit, a failure impact on the one or more resources based on the first data collected by the at least one collector unit;
creating, by the mapping unit, a relationship map for the one or more resources based on the identified failure impact, wherein the relationship map depicts a detailed relationship mapping between all virtual components of the one or more resources to all physical components of the one or more resources based on the identified failure impact, wherein upon the creation of the relationship map, the one or more resources are mapped based on a type of the one or more resources;
automatically diagnosing, by a fault processor, the data center on occurrence of a fault based on the relationship map; and
troubleshooting, by the fault processor, at least one of the one or more resources based on the diagnosing of the data center.

\* \* \* \* \*